United States Patent [19]

Norbäck et al.

[11] 4,105,584

[45] Aug. 8, 1978

[54] PROCESS FOR PREPARING A DISPERSION

[75] Inventors: Håkan Nils Norbäck; Benkt Göran Rurik Asp, both of Stockholm, Sweden

[73] Assignee: KemaNobel AB, Stockholm, Sweden

[21] Appl. No.: 704,868

[22] Filed: Jul. 13, 1976

[30] Foreign Application Priority Data

Jul. 29, 1975 [SE] Sweden .............................. 7508603

[51] Int. Cl.² .......................... B01J 31/02; B01J 27/20
[52] U.S. Cl. ..................................... 252/426; 252/443
[58] Field of Search ................................ 252/426, 443

[56] References Cited

U.S. PATENT DOCUMENTS

| 2,899,414 | 8/1959 | Mertes | 526/88 |
| 2,968,652 | 1/1961 | Mertes | 252/477 R |
| 3,134,642 | 5/1964 | Mertes | 252/429 A |

FOREIGN PATENT DOCUMENTS 836,702  6/1960  United Kingdom ................ 252/431 R Primary Examiner—Patrick P. Garvin
Assistant Examiner—William G. Wright
Attorney, Agent, or Firm—Fred Philpitt

[57] ABSTRACT

The present invention relates to the preparation of a dispersion of solid dialkyl-peroxydicarbonates in an aqueous medium. More particularly the invention relates to the preparation of such dispersions from a slurry of water, dispersing agent and dialkyl-peroxydicarbonate which is converted to a stable dispersion in an ultrasonic homogenizer.

3 Claims, No Drawings

PROCESS FOR PREPARING A DISPERSION

BACKGROUND

Dialkyl-peroxydicarbonates are mainly used in the polymerization industry as initiators for ethylenically unsaturated polymerizable compounds, particularly as initiators for the polymerization of vinyl chloride. Dialkyl-peroxydicarbonates are relatively unstable compounds and at a certain temperature they decompose forming free radicals which start the polymerization. The decomposition temperature varies with the chain length of the alkyl groups and short-chain dialkyl-peroxy-dicarbonates, e.g. diethyl- or di-isopropyl-peroxydicarbonates decompose explosively at about 25° C and must therefore be cold stored. Peroxydicarbonates having higher alkyl groups (also including cyclic derivatives) are more stable but certain precautions must likewise be taken in storing and handling of these. The lower peroxydicarbonates are liquid and are charged as such or dissolved in a solvent during the polymerization while the higher peroxydicarbonates are solid and are charged to the polymerization reactor in the form of powder. The recent development in vinyl chloride polymerization technique, change-over to very large polymerization autoclaves and computerized process control and the discovered environmental problems of the noxiousness of vinyl chloride, has made handling of the dialkyl-peroxydicarbonates in the form of dispersions desirable. Charging of the initiator by pumping into the reactor without necessity of opening it means that the polymerization operators avoid contact with vinyl chloride.

Liquid dialkyl-peroxydicarbonates, i.e. such having shortchain alkyl groups, are easily brought into dispersion by agitation in a cold mixture of water and emulsifier. The solid peroxydicarbonates have the disadvantage of being difficult to bring into aqueous dispersion without reducing the active peroxide content, which involves decreasing the efficiency of the peroxydicarbonates as initiators. Dispersing solid dialkyl-peroxydicarbonates in water by means of e.g. turbine agitators, colloid mills, pressure homogenizers or ball mills does give dispersions, but these show reduced active peroxide content of the solid peroxydicarbonate.

THE PRESENT INVENTION

According to the present invention it has been found that stable dispersions of solid peroxydicarbonates having unchanged peroxide content can be obtained by dispersion of a slurry of peroxydicarbonate, dispersing agent and water in an ultrasonic homogenizer.

During dispersion in the ultrasonic homogenizer the slurry is pumped at a high pressure, generally within the range of 1 - 4 MPa, through a nozzle and hits, at a high velocity, a blade which is caused to vibrate at its ultrasonic frequency and hereby produces cavitation energy. The solid peroxydicarbonate granules are decomposed to primary particles in this cavitation area. However, the peroxydicarbonates as such are not decomposed, and the dispersions show an unchanged peroxide content.

The slurry is preferably passed through the ultrasonic homogenizer twice in order to obtain stable dispersions.

The solid dialkyl-peroxydicarbonates which can be dispersed according to the present process have alkyl groups containing more than 12 carbon atoms in each alkyl group, preferably 12 to 18 carbon atoms. As examples of suitable peroxydicarbonates can be mentioned dimyristyl-, dicetyl- and distearyl-peroxydicarbonates. Other solid peroxydicarbonates which advantageously can be dispersed according to the present process are the cycloakyl derivatives such as di-cyclohexyl- and disubstituted cyclohexyl peroxydicarbonate e.g. di-4-tertiary-butyl-cyclohexyl peroxydicarbonate.

In the dispersion process any known dispersing agents can be used, but since the dispersions of peroxydicarbonates preferably are used in the polymerization of vinyl chloride it is preferable to use any of the known protective colloids and emulsifiers for such polymerization. As examples of some suitable emulsifiers which can be mentioned are polyvinyl alcohol, cellulose ethers, such as carboxymethyl cellulose, hydroxyalkyl cellulose etc., ethoxylated fatty acid derivatives, alkali-metal salts of alkylsulfate, alkyl sulfonate, aryl sulfonate etc., quaternary ammonium compounds or a mixture of these. The amount of dispersing agent should exceed 0.5 percent by weight based on the dispersion. 0.5 to 10 percent by weight can be suitably used and preferably 1 to 5 percent by weight.

The solids content of the obtained dispersions can be kept as high as 30 percent by weight and preferably within the range of 10 to 20 percent by weight. At too high solids contents the viscosity may increase to such an extent that the handling of the dispersion is impaired.

The aqueous slurry of peroxydicarbonate and dispersing agent should before, during and after the dispersion process be kept at a temperature below the decomposition temperature.

The invention is further illustrated in the following examples which, however, are not intended to limit the scope of the invention.

EXAMPLE 1

A slurry of 20 percent by weight of dicetylperoxydicarbonate having an active peroxide content of 85% (Liladox ® sold by KemaNord AB, Sweden) and 2 percent by weight of polyvinyl alcohol in 78 percent by weight of water was twice passed through an ultrasonic homogenizer (sold by Ultrasonics Ltd. England). The obtained dispersion was stable after one week and analysis showed that the peroxide content was unchanged 85%.

EXAMPLE 2

As a comparison the same mixture as in Example 1 dispersed in a colloid mill (Ultra-Turrax ® sold by Janke & Kunkel KG, Germany). This dispersion was also stable after one week but the active peroxide content was only 72% i.e. a reduction of about 15%.

EXAMPLE 3

Peroxydicarbonates having different alkyl groups were dispersed by utilization of different dispersing agents and the obtained results are shown in the table. All the dispersions were stable after one week.

| Peroxydi-carbonate | % by weight | Homog-enizer equipment | Disper-sing agent | % by weight | Peroxide Content before disper-sion | Peroxide Content after dis-per-sion |
|---|---|---|---|---|---|---|
| dicetyl | 15 | ultra-sonic | A | 5 | 85 | 85 |
| dicetyl | 15 | colloid mill | A | 5 | 85 | 70 |
| dimyristyl | 10 | ultra- | B | 4 | 80 | 89 |

-continued

| Peroxydi-carbonate | % by weight | Homogenizer equipment | Dispersing agent | % by weight | Peroxide Content before dispersion | Peroxide Content after dispersion |
|---|---|---|---|---|---|---|
| dimyristyl | 10 | sonic colloid mill | B | 4 | 80 | 71 |
| distearyl | 15 | ultrasonic | C | 2 | 78 | 78 |
| distearyl | 15 | sonic colloid mill | C | 2 | 78 | 67 |

A = cellulose ether
B = ethoxylated fatty acid derivative
C = polyvinyl alcohol

As is evident from the above tabulation, the active peroxide content of the peroxydicarbonate which had been dispersed according to the present invention was not reduced.

We claim:

1. A process for the preparation of stable aqueous dispersions of solid peroxydicarbonates having unchanged active peroxide content, characterized in that a slurry of water, dispersing agent and peroxydicarbonate is dispersed in an ultrasonic homogenizer, said solid peroxydicarbonate being selected from the group consisting of dialkyl peroxydicarbonates and cycloalkyl peroxydicarbonates.

2. A process according to claim 1 wherein each alkyl group of the dialkyl peroxydicarbonate has between 12 and 18 carbon atoms.

3. A process according to claim 1 wherein the cycloalkyl peroxydicarbonate is selected from the group consisting of dicyclohexyl peroxydicarbonate and di-4-tertiary-butyl-cyclohexyl peroxydicarbonate.

* * * * *